United States Patent
Chang et al.

(10) Patent No.: US 9,634,737 B2
(45) Date of Patent: Apr. 25, 2017

(54) PERIODIC NEAR FIELD DIRECTORS (PNFD) FOR SHORT-RANGE MILLI-METER-WAVE-WIRELESS-INTERCONNECT (M2W2-INTERCONNECT)

(75) Inventors: Mau-Chung Frank Chang, Los Angeles, CA (US); Sai-Wang Tam, Rosemead, CA (US)

(73) Assignee: The Regents of the University of California, Oakland, CA (US)

( * ) Notice: Subject to any disclaimer, the term of this patent is extended or adjusted under 35 U.S.C. 154(b) by 191 days.

(21) Appl. No.: 13/993,807

(22) PCT Filed: Dec. 16, 2011

(86) PCT No.: PCT/US2011/065576
§ 371 (c)(1),
(2), (4) Date: Jun. 13, 2013

(87) PCT Pub. No.: WO2012/083213
PCT Pub. Date: Jun. 21, 2012

(65) Prior Publication Data
US 2013/0266048 A1    Oct. 10, 2013

Related U.S. Application Data

(60) Provisional application No. 61/424,554, filed on Dec. 17, 2010.

(51) Int. Cl.
*H04B 7/00* (2006.01)
*H04B 5/02* (2006.01)
(Continued)

(52) U.S. Cl.
CPC ............. *H04B 5/02* (2013.01); *H01Q 15/02* (2013.01); *H04B 5/0031* (2013.01)

(58) Field of Classification Search
CPC ............. H04B 5/02; H04B 5/00; H04B 1/38
(Continued)

(56) References Cited

U.S. PATENT DOCUMENTS 8,254,983 B2 * 8/2012 Rofougaran ........ G06F 13/4068
257/751
2004/0069984 A1    4/2004 Estes et al.
(Continued)

FOREIGN PATENT DOCUMENTS

CN    101006611    7/2007
CN    101145810    3/2008
(Continued)

OTHER PUBLICATIONS

Chinese Office Action (with English translation) dated Jul. 30, 2014 for Chinese Patent Application No. 201180067733.1.
(Continued)

*Primary Examiner* — Md Talukder
(74) *Attorney, Agent, or Firm* — Gates & Cooper LLP

(57) ABSTRACT

Periodic near field directors (PNFDs) are coupled to a transmitter and a receiver for a short-range millimeter wave wireless (M2W2) interconnect for transmitting and receiving radio frequency (RF) signals at millimeter-wave frequencies for short-range communication with high data rate capability between the transmitter and receiver. Each of the periodic near field directors is comprised of one or more periodic coupling structures (PCSs), wherein the periodic coupling structures are comprised of metallic strips positioned such that their lengthwise dimension is substantially perpendicular to a propagation direction of the radio frequency signals between the transmitter and receiver. Each of the periodic coupling structures is positioned parallel to adjacent periodic coupling structures with a separation distance between each periodic coupling structure being within
(Continued)

one wavelength of the radio frequency signal. The periodic near field directors may include first and second periodic near field directors that are coupled to each other for transmitting and receiving the radio frequency signals between the first and second periodic near field directors, wherein there is an air gap between the first and second periodic near field directors.

20 Claims, 17 Drawing Sheets

(51) Int. Cl.
*H04B 5/00* (2006.01)
*H01Q 15/02* (2006.01)

(58) Field of Classification Search
USPC .................................. 455/41.1, 41.2, 41.3
See application file for complete search history.

(56) References Cited

U.S. PATENT DOCUMENTS

| | | | |
|---|---|---|---|
| 2007/0216591 A1* | 9/2007 | Tsirline | G06K 7/10316 343/753 |
| 2008/0153416 A1* | 6/2008 | Washiro | H04B 5/00 455/41.1 |
| 2009/0239483 A1* | 9/2009 | Rofougaran | H04L 12/40013 455/90.2 |
| 2009/0286476 A1* | 11/2009 | Toncich | G06K 7/0008 455/41.1 |
| 2009/0318105 A1 | 12/2009 | Rofougaran et al. | |
| 2010/0001917 A1* | 1/2010 | Manasson | H01Q 13/28 343/785 |
| 2010/0231452 A1* | 9/2010 | Babakhani | G01S 7/032 342/368 |
| 2010/0248625 A1* | 9/2010 | Washiro | H01Q 1/007 455/41.1 |
| 2010/0278538 A1 | 11/2010 | Guidotti et al. | |
| 2010/0321261 A1* | 12/2010 | Thevenot | H01P 1/2005 343/731 |
| 2011/0222585 A1* | 9/2011 | Washiro | H01P 5/085 375/130 |
| 2013/0171933 A1* | 7/2013 | Rofougaran | G06K 19/0724 455/41.1 |
| 2013/0266048 A1* | 10/2013 | Chang | H04B 5/0031 375/219 |
| 2014/0273853 A1* | 9/2014 | Isaac | H04B 5/02 455/41.2 |

FOREIGN PATENT DOCUMENTS

| | | | | |
|---|---|---|---|---|
| EP | 1919030 | | 5/2008 | |
| EP | 1919030 A1 * | 5/2008 | | .............. H01Q 1/22 |
| WO | WO 2008135677 A1 * | 11/2008 | | |
| WO | 2010144617 | | 12/2010 | |

OTHER PUBLICATIONS

International Search Report and Written Opinion for PCT/US2011/065576, mailed Jul. 25, 2012.
Chinese Office Action (with English translation) dated Apr. 17, 2015 for Chinese Patent Application No. 2011800677331.
Chinese Office Action (with English translation) dated Dec. 31, 2015 for Chinese Patent Application No. 201180067733.1.
Japanese Office Action (with English Translation) dated Jan. 13, 2016 for Japanese Patent Application No. 2013-544840.
Japanese Office Action (with English translation) dated Oct. 27, 2016 for Japanese Patent Application No. 2013-544840.
Kang et al., Transfer Functions of On-Chip Global Interconnects Based on Distributed RLCG Interconnects Model, 2005 IEEE Antennas and Propagation Society International Symposium Digest, 2005, vol. 1A, pp. 524-527.
Kimoto et al., High-Gain On-Chip Antennas for LSI Intra-/Inter-Chip Wireless Interconnection, 2009 3rd European Conference on Antennas and Propagation Proceedings, 2009, pp. 278-282.
Chinese Office Action (with English translation) dated Sep. 2, 2016 for Chinese Patent Application No. 201180067733.1.

* cited by examiner

PERIODIC NEAR FIELD DIRECTORS (PNFD) FOR SHORT-RANGE MILLI-METER-WAVE-WIRELESS-INTERCONNECT (M2W2-INTERCONNECT)

CROSS REFERENCE TO RELATED APPLICATIONS

This application claims the benefit under 35 U.S.C. Section 119(e) of and commonly-assigned U.S. Provisional Patent Application Ser. No. 61/424,554, filed on Dec. 17, 2010, by Mau-Chung F. Chang and Sai-Wang Tam, entitled "PERIODIC NEAR FIELD DIRECTORS (PNFD) FOR SHORT-RANGE MILLI-METER-WAVE-WIRELESS-INTERCONNECT (M2W2-INTERCONNECT),", which application is incorporated by reference herein.

This application is related to co-pending and commonly-assigned U.S. Utility application Ser. No. 13/377,124, filed on Dec. 8, 2011, by Sai-Wang Tam and Mau-Chung F. Chang, entitled "MILLI-METER-WAVE-WIRELESS-INTERCONNECT (M2W2-INTERCONNECT) METHOD FOR SHORT-RANGE COMMUNICATIONS WITH ULTRA-HIGH DATA RATE CAPABILITY,", which application is a national stage under 35 U.S.C. Section 371 of and claims the benefit under 35 U.S.C. Section 365 (c) to co-pending and commonly-assigned P.C.T. International Application No. PCT/US2010/038033, filed on Jun. 9, 2010, by Sai-Wang Tam and Mau-Chung F. Chang, entitled "MILLI-METER-WAVE-WIRELESS-INTERCONNECT (M2W2-INTERCONNECT) METHOD FOR SHORT-RANGE COMMUNICATIONS WITH ULTRA-HIGH DATA RATE CAPABILITY,", which application claims the benefit under 35 U.S.C. Section 119(e) of and commonly-assigned U.S. Provisional Patent Application Ser. No. 61/185,946, filed on Jun. 10, 2009, by Sai-Wang Tam and Mau-Chung F. Chang, entitled "MILLI-METER-WAVE-WIRELESS-INTERCONNECT (M2W2-INTERCONNECT) METHOD FOR SHORT-RANGE COMMUNICATIONS WITH ULTRA-HIGH DATA RATE CAPABILITY,", which applications are incorporated by reference herein.

BACKGROUND OF THE INVENTION

1. Field of the Invention

This invention relates to periodic near field directors (PNFD) for a short-range millimeter wave wireless (M2W2) interconnect.

2. Description of the Related Art

In the work described in the cross-referenced related applications set forth above and incorporated by reference herein (application Ser. Nos. 13/377,124, PCT/US2010/038033 and 61/185,946), an on-chip antenna was used for wireless data transmission in short-range communications. However, due to lossy silicon substrates, the radiation efficiency of the on-chip antenna is extremely low, and subsequently, the channel loss across a 5 mm air gap can be as high as 60 dB. This severe channel loss significantly tightens the overall link budget and further increases the difficulty of designing a highly power efficient M2W2 transceiver architecture.

Thus, there is a need in the art for improved methods of wireless data transmission. The present invention satisfies that need.

SUMMARY OF THE INVENTION

To overcome the limitations in the prior art described above, and to overcome other limitations that will become apparent upon reading and understanding the present specification, the present invention discloses periodic near field directors (PNFDs) that are coupled to a transmitter and a receiver for a short-range millimeter wave wireless (M2W2) interconnect for transmitting and receiving radio frequency (RF) signals at millimeter-wave frequencies for short-range communication with high data rate capability between the transmitter and receiver. Each of the periodic near field directors is comprised of one or more periodic coupling structures (PCSs), wherein the periodic coupling structures are comprised of metallic strips positioned such that their lengthwise dimension is substantially perpendicular to a propagation direction of the radio frequency signals between the transmitter and receiver. Each of the periodic coupling structures is positioned parallel to adjacent periodic coupling structures with a separation distance between each periodic coupling structure being within one wavelength of the radio frequency signal. The periodic near field directors may include first and second periodic near field directors that are coupled to each other for transmitting and receiving the radio frequency signals between the first and second periodic near field directors, wherein there is an air gap between the first and second periodic near field directors.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

This invention describes a periodic near field director (PNFD) for a short-range millimeter wave wireless (M2W2) interconnect, wherein the PNFD significantly reduces the channel loss in millimeter-wave frequencies for short range wireless communications, which enables a highly power efficient M2W2-interconnect technique with high data rate capability. In one embodiment, the PNFDs of this invention are used for ultra short distance (less than 10 cm) chip-to-chip or board-to-board multi-gigabit communications.

Millimeter-Wave-Wireless-Interconnect (M2W2-Interconnect)

Figure 1A:
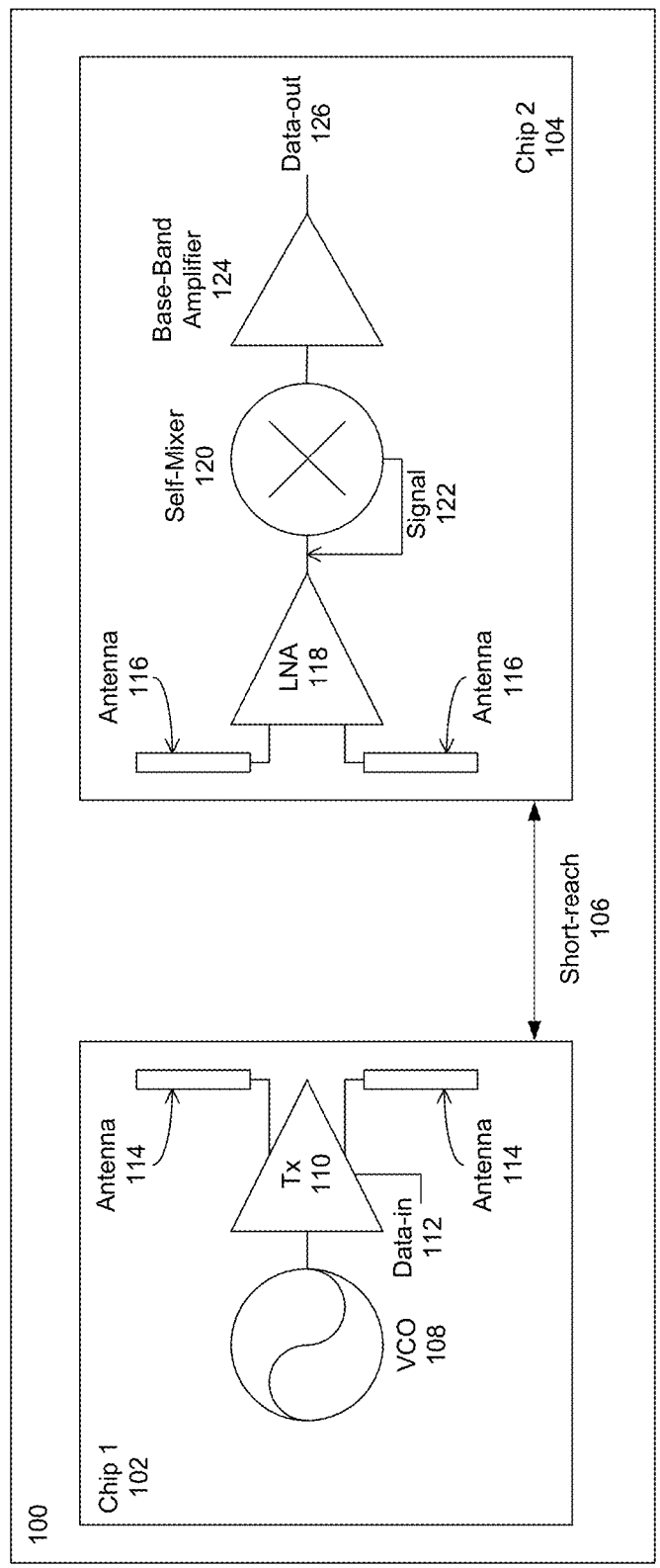
FIG. 1A is a schematic of a millimeter-wave-wireless-interconnect (M2W2-Interconnect).

A general millimeter-wave-wireless-interconnect (M2W2-Interconnect), as described in the cross-referenced related applications set forth above and incorporated by reference herein (application Ser. Nos. 13/377,124, PCT/US2010/038033 and 61/185,946), and as shown in the schematic of FIG. 1A, transmits the data over the air using a radio-frequency (RF) signal for a very short distance without any physical contact, in contrast to a conventional high speed board-to-board connector, which is lossy and has poor mechanical properties. Usually, a M2W2-interconnect utilizes an on-chip antenna to receive or transmit the RF signal over the open air channel.

Unfortunately, due to lossy silicon substrates, the radiation efficiency of the on-chip antenna is extremely low, usually less than 5%. From measurement results, the channel loss across a 5 mm air gap can be as high as 60 dB. This severe channel loss significantly tightens the overall link budget and further increases the difficulty of designing a highly power efficient M2W2 transceiver architecture.

Consider the single channel wireless M2W2 interconnect 100 of FIG. 1A, which couples a first chip (Chip 1) 102 comprising a transmitter to a second chip (Chip 2) 104 comprising a receiver, wherein the first chip 102 is physically separated from the second chip 104 by a short reach or length 106. Asynchronous modulation and differential signaling is used for communicating between the integrated circuit (IC) chips or dies 102 and 104 on the same or different printed circuit boards (PCBs).

The first chip 102 includes a voltage-controlled oscillator (VCO) 108 for generating a radio frequency (RF) carrier signal, and a transmitter (Tx) 110 for modulating the RF carrier signal using a data-in signal 112 comprising an input data stream, wherein the modulated RF carrier signal is then fed to an on-chip differential dipole antennae 114 that radiates the modulated RF carrier signal (although a bond-wire dipole antenna may be used as well).

The second chip 104 includes an on-chip differential dipole antenna 116 for receiving the radiated RF carrier signal, which is then fed into a low-noise amplifier (LNA) 118 to generate an amplified RF carrier signal. The amplified RF carrier signal is converted by demodulation at a self-mixer 120 by self-mixing the amplified RF carrier signal with itself 122 to generate a base-band signal. The base-band signal is amplified by a base-band amplifier 124 to generate a data-out signal 126 comprising an output data stream that is a full swing digital signal.

The transmitter 110 implements the ASK modulation, which is an asynchronous modulation scheme, using a pair of on-off switches that directly modulates the RF carrier signal using the data-in signal 112. The output of the transmitter 110 is then fed to the antenna 114 without any further amplification.

Unlike other synchronous modulation schemes, such as binary-phase shift-keying (BPSK), the receiver in the asynchronous ASK modulation system only detects changes in amplitude of the RF carrier signal, but does not detect changes in phase or frequency variations of the RF carrier signal. Therefore, the receiver can operate asynchronously without a power hungry phase lock loop (PLL).

ASK modulation also eliminates the need for RF carrier signal regeneration at the receiver by using a differential circuit architecture and a differential-mutual-mixing technique to automatically remove the RF carrier signal with no additional components required. Consequently, the M2W2 interconnect does not suffer from process-induced carrier variations between the transmit (Tx) and receive (Rx) functions.

The differential dipole antenna 114 is able is boost the input impedance, which provides better power matching between the ASK modulation of the transmitter 110 and the antenna 114. Moreover, this design using an on-chip antenna 114 eliminates the need to have any packaging operating in millimeter-wave frequencies and electrostatic discharge (ESD) protection circuits.

M2W2-Interconnect using a PNFD Structure

To improve the performance of the M2W2 interconnect 100 of FIG. 1A, the present invention includes one or more PNFDs in the M2W2 interconnect, wherein the PNFDs provide field coupling, in order to significantly reduce channel loss.

In principle, there are two types of coupling, namely near field coupling and far field coupling. The range of near field coupling is usually within one wavelength. In mm-wave frequencies, one wave length is in the order of several millimeters, and therefore, the range of the near field coupling is very limited. Moreover, most of the near field coupling is isotropic, which means poor performance in coupling directivity and isolation. In many applications, such as M2W2, excellent isolation between adjacent transceivers is the key to achieve high bandwidth density.

Figure 1B:
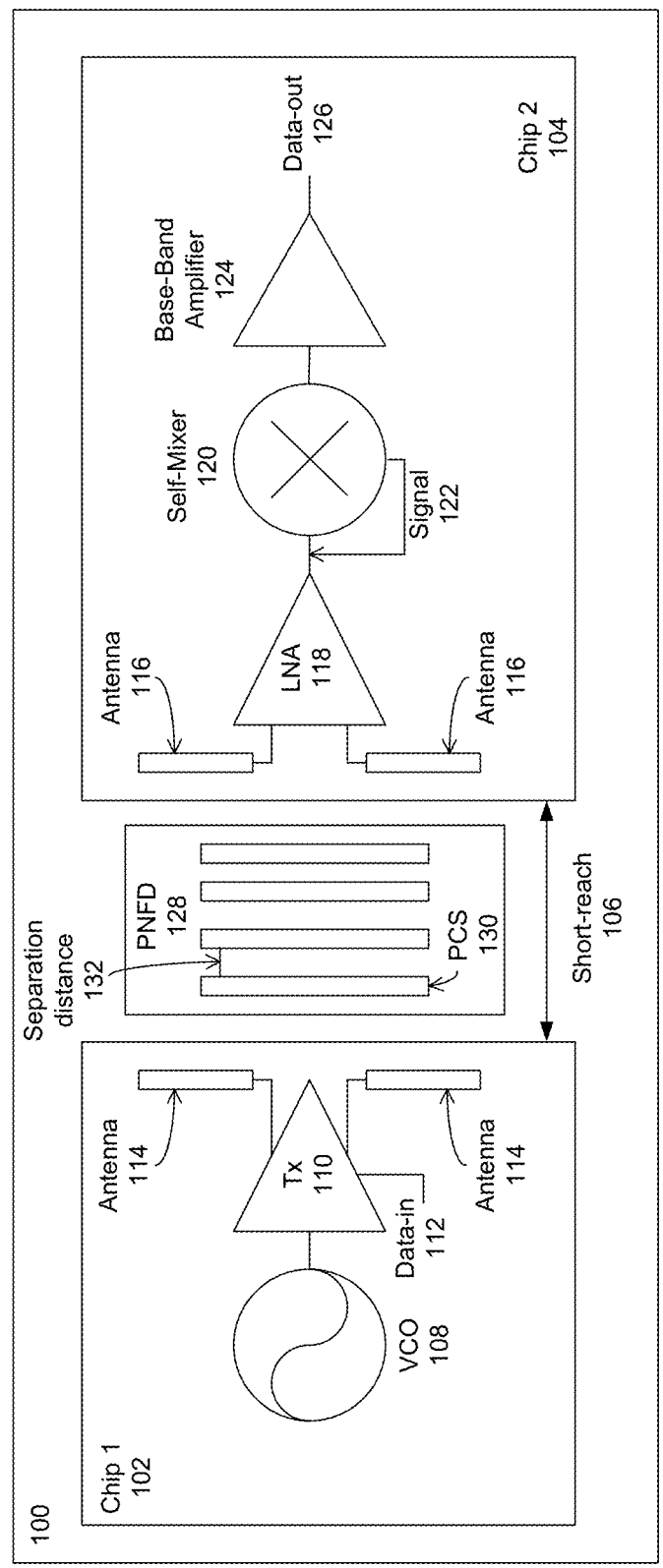
FIG. 1B is a schematic of a millimeter-wave-wireless-interconnect using a periodic near field director (PNFD), according to one embodiment of the present invention.

A M2W2-interconnect using a PNFD structure is shown in FIG. 1B, which is comprised of a pair of mm-wave transceivers and the PNFD structure. Specifically, FIG. 1B is a schematic of a single channel wireless M2W2 interconnect the same as FIG. 1A, but with an off-chip PNFD 128 positioned between Chip 1 102 and Chip 2 104.

The PNFD 128 is comprised of one or more periodic coupling structures (PCSs) 130 (also known as periodic guiding structures or periodic director structures) that are comprised of metallic strips positioned such that their lengthwise dimension is substantially perpendicular to the propagation direction of the RF signals between Chip 1 102 and Chip 2 104. Moreover, the PCSs 130 are positioned parallel to adjacent PCSs 130 with a separation distance 132 between each PCS 130 being within one wavelength of the transmitted RF signal (i.e., less than or equal to one wavelength of the transmitted RF signal).

The PNFD 128 not only can effectively extend the coupling range between adjacent transceivers, but it is also able to achieve excellent isolation between the adjacent transceivers. The basic concept of the PNFD 128 is to utilize the near field coupling in the PCSs 130. As long as the separation distance 132 between each PCS 130 in the PNDF 128 is within one wavelength, the coupling between two consecutive PCSs 132 remains strong, and the near field coupling can be effectively extended in a cascade fashion.

Note that FIG. 1B is merely illustrative, is not drawn to scale, and is not meant to be restrictive in any sense. The PNFD 128 and PCSs 130 may be comprised of different dimensions, structures and positions than those shown. Moreover, the PNFD 128 and PCSs 130 may be comprised of various compositions, and may be fabricated using any number of well-known fabrication techniques.

Figure 1C:
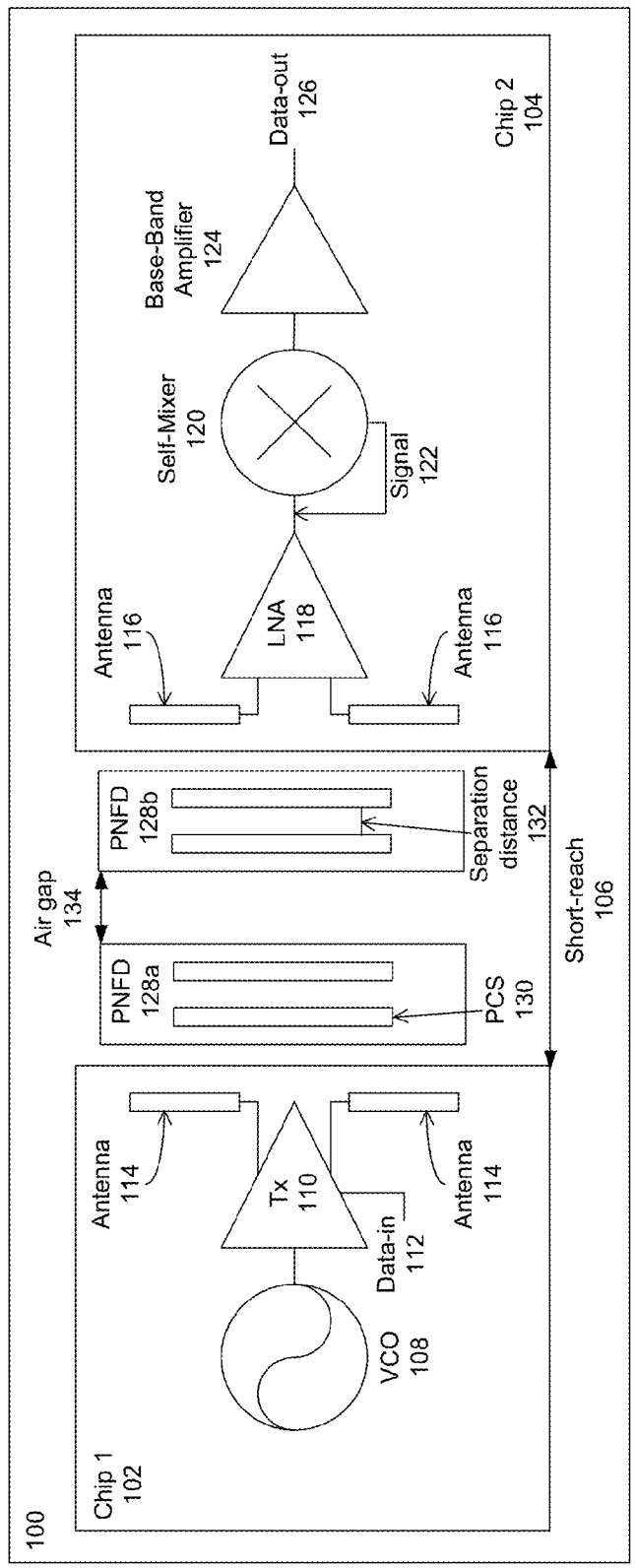
FIG. 1C is a schematic of a millimeter-wave-wireless-interconnect using two periodic near field directors with an air gap between the periodic near field directors, according to one embodiment of the present invention.

As illustrated in FIG. 1C, the PNFD concept of the present invention can be further expanded by inserting an air gap 134 between two PNFDs 128a, 128b to further extend the communication distance. In this case, Chip 1 102 first generates the modulated RF signal, and the on-chip antenna 114 couples this signal to the first PNFD 128a through near field coupling. As long as the separation of the air-gap 134 between the two PNFDs 128a, 128b is within the near field coupling range, the PNFD 128a for Chip 1 102 can still effectively couple the modulated RF signal to the PNFD 128b for Chip 2 104, which subsequently couples the modulated RF signal to the on-chip antenna 116 for Chip 2 104.

This concept effectively removes the need for lossy mm-wave packaging and reduces the complexity of the overall M2W2-interconnect.

PNFD Simulation Model

Figure 2A:
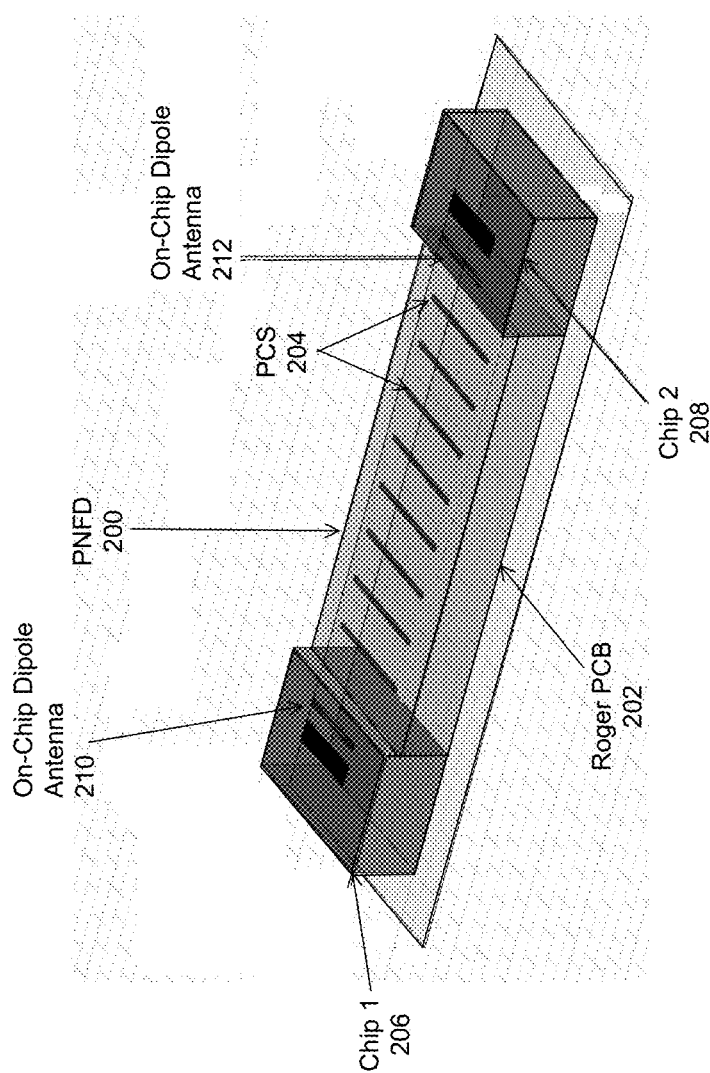
FIGS. 2A, 2B and 2C show a 3-dimension (3D) simulation model of a millimeter-wave-wireless-interconnect using a periodic near field director, according to one embodiment of the present invention.
Figure 2B:
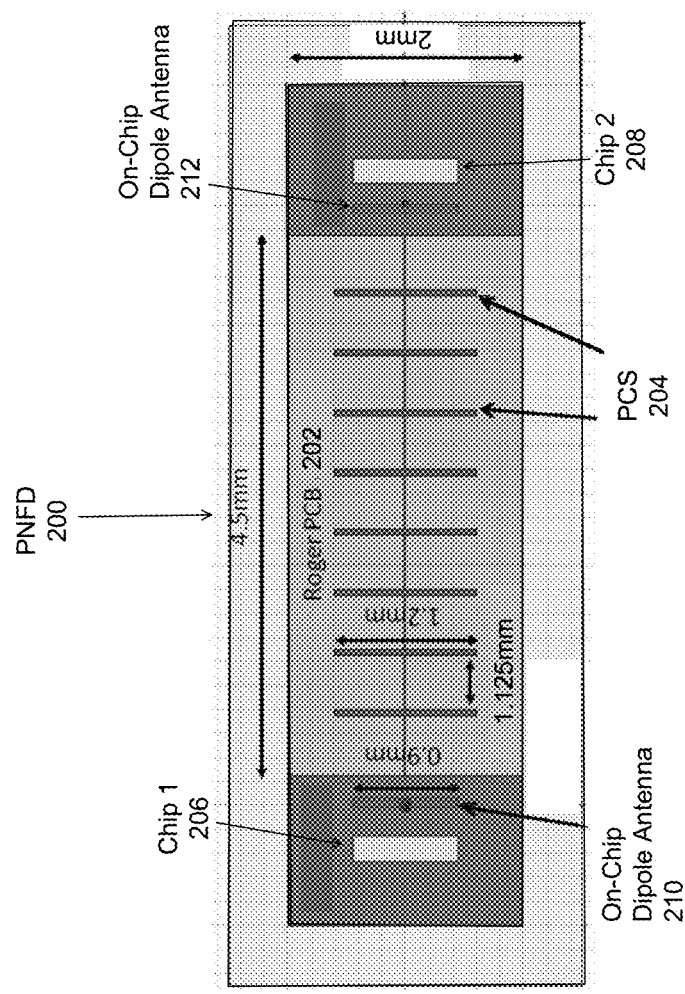
Figure 2C:
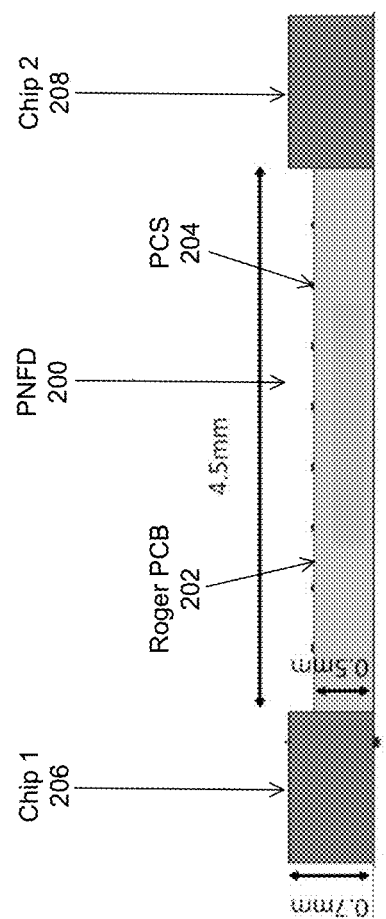

FIGS. 2A, 2B and 2C show a 3-dimension (3D) simulation model of the present invention developed in a simulation tool for 3D full-wave electromagnetic (EM) field simulation, known as HFSS™. In this model, the PNFD 200 is comprised of a 4.5 mm×2 mm Roger™ printed circuit board (PCB) 202 with a dielectric constant $\varepsilon=4.2$. The PCSs 204 are placed on top of the Roger™ PCB 202, and have a length of 1.2 mm with a 1.125 mm separation distance between consecutive PCSs 204. In addition, two silicon substrates or chips 206, 208 with on-chip dipole antennae 210, 212 are placed on each end of the Roger board 202, wherein the Roger™ PCB 202 has a thickness or height of 0.5 mm, the two silicon substrates or chips 206, 208 have a thickness or height of 0.7 mm, and the antennae 210, 212 have length of 0.9 mm. In this model, the simulated channel loss is about −30 dB, as described in FIG. 3.

Figure 3:
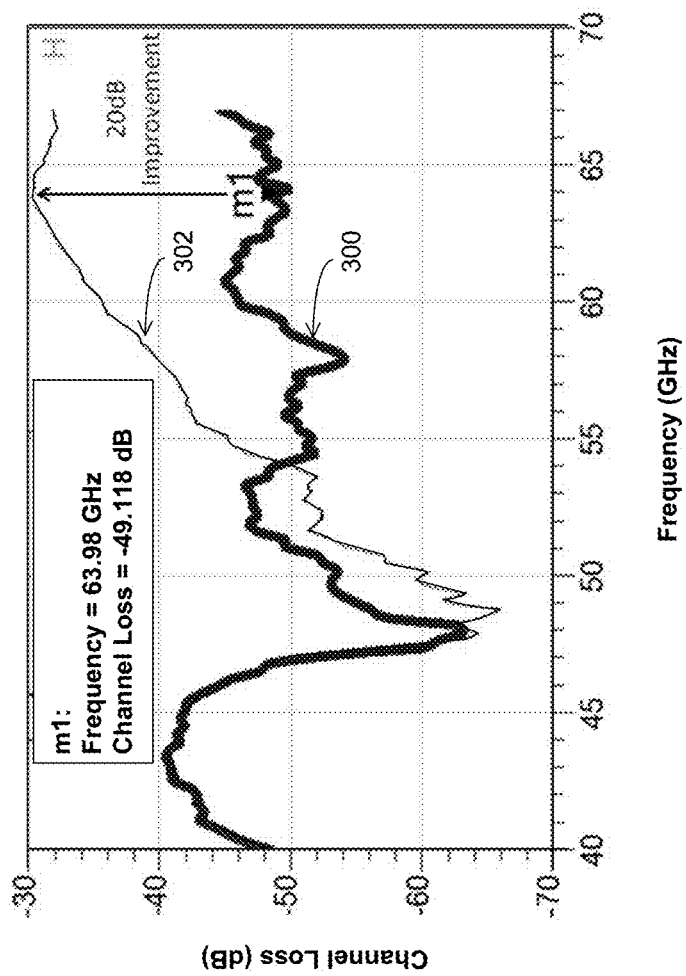
FIG. 3 is a graph of frequency (GHz) vs. channel loss (dB) that shows measurement results of a periodic near field director with the same dimension as the 3D simulation model of FIGS. 2A, 2B and 2C.

FIG. 3 is a graph of frequency (GHz) vs. channel loss (dB) that shows measurement results of the PNFD with the same dimension as the HFSS simulation model of FIGS. 2A, 2B and 2C. The blue color (thick line) curve 300 represents the PNFD without any PCSs, and the measured channel loss is about −50 dB across 5 mm separation. The red color (thin line) curve 302 represents the PNFD with PCSs, and the measured channel loss is about −30 dB across a 5 mm separation. From these measurement results, the PNFD is able to improve the channel loss by about 20 dB which significantly relaxes the linked budget of the M2W2-interconnect.

Experimental Results

PNFDs for the M2W2-Interconnect method for short-range communications have been designed, fabricated and validated by measurement results. These implementations have been realized using a 65 nm commercial CMOS process and a Roger™ printed-circuit board (PCB).

Figure 4:
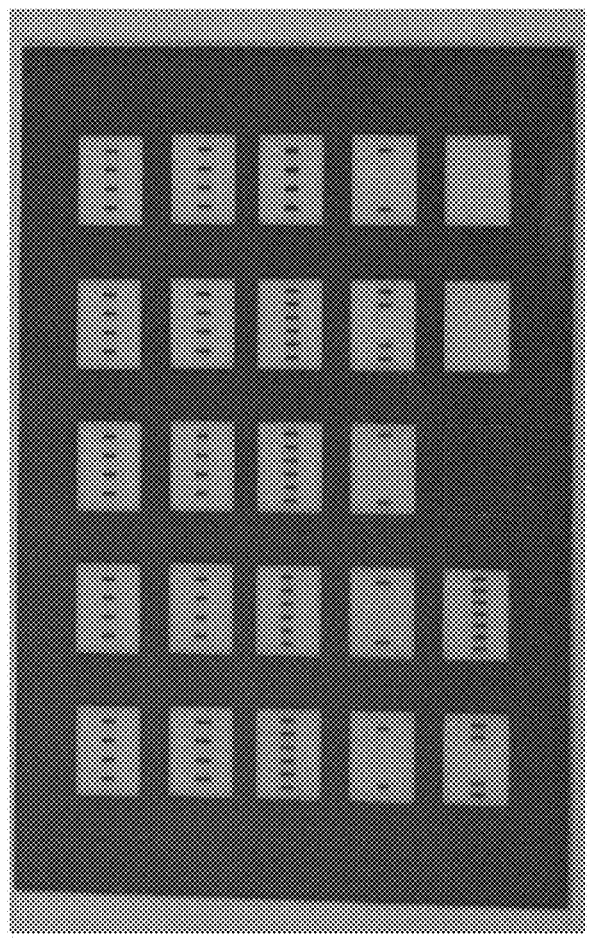
FIG. 4 is a micrograph of a 5×5 array of periodic near field directors with different periodic coupling structure dimensions and geometry, according to one embodiment of the present invention.

In one example, in order to demonstrate the PNFD concept, a 5×5 array of PNFDs with different PSC dimensions and geometry has been designed and implemented in a Roger™ PCB, which is shown in the micrograph of FIG. 4.

Figure 5A:
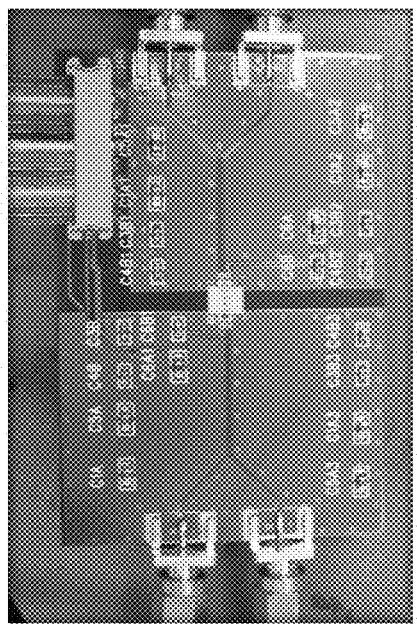
FIG. 5A is a photograph of a demonstration board of a high speed isolator, according to one embodiment of the present invention.
Figure 5B:
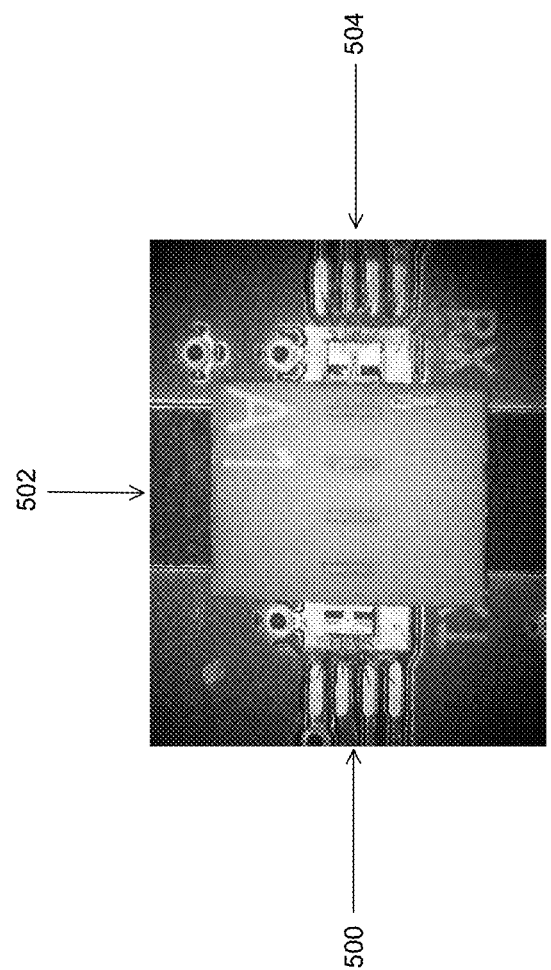
FIG. 5B is a magnified view of FIG. 5A showing a Transmitter (TX) chip, periodic near field director, and Receiver (RX) chip, used in the demonstration board.

In another example, a high speed M2W2-Interconnect with a PNFD has been implemented on a demonstration board to illustrate the high speed isolator application of the present invention. This high speed M2W2-Interconnect is comprised of an ASK transmitter with on-chip antenna, a 5 mm PNFD on the Roger™ PCB and an ASK receiver with on-chip antenna. FIG. 5A is a photograph of the demonstration board of the high speed isolator. FIG. 5B is a magnified view of FIG. 5A showing a Transmitter (TX) chip 500, PNFD (center) 502, and Receiver (RX) chip 504, used in the demonstration board.

Figure 6A:
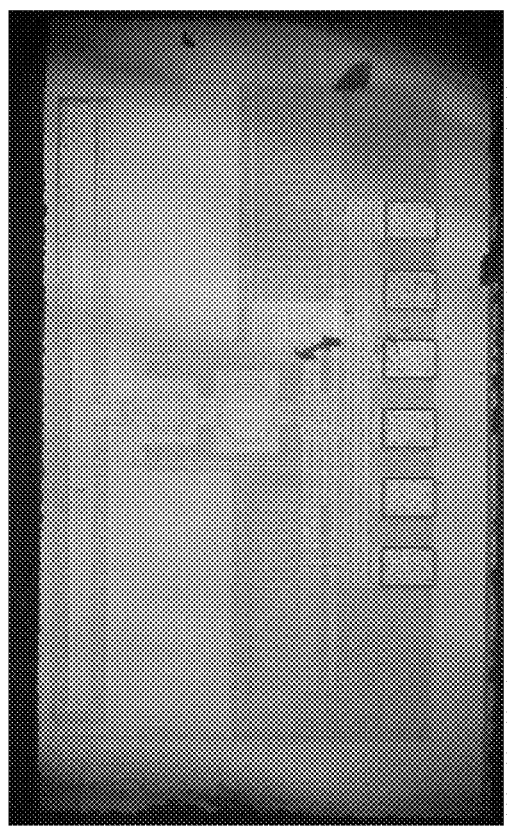
FIG. 6A is a micrograph of a Transmitter (TX) chip used in the demonstration board of the high speed isolator application of FIGS. 5A and 5B.

FIG. 6A is a micrograph of a Transmitter (TX) chip used in the demonstration board of the high speed isolator application of FIGS. 5A and 5B.

Figure 6B:
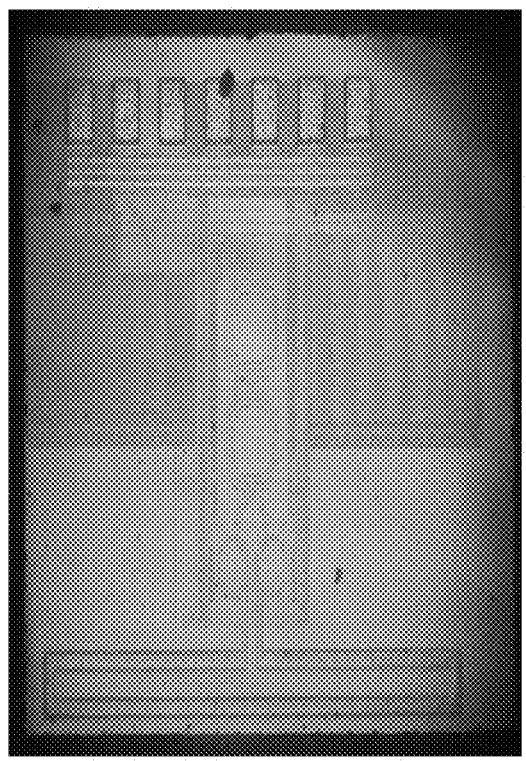
FIG. 6B is a micrograph of a Receiver (RX) chip used in the demonstration board of the high speed isolator application of FIGS. 5A and 5B.

FIG. 6B is a micrograph of a Receiver (RX) chip used in the demonstration board of the high speed isolator application of FIGS. 5A and 5B.

Figure 7:
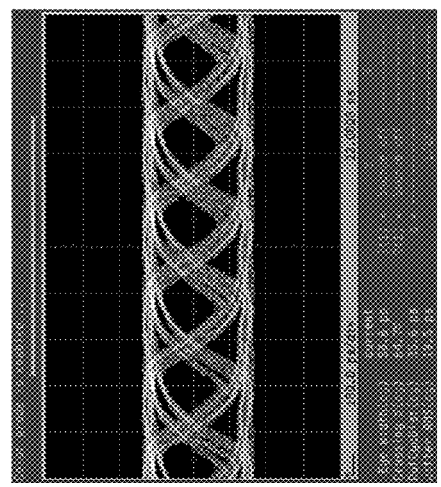
FIG. 7 shows a measured 5.7 Gbit/s eye diagram of the demonstration board of the high speed isolator application of FIGS. 5A and 5B.

FIG. 7 shows a measured 5.7 Gbit/s eye diagram of the demonstration board of the high speed isolator application of FIGS. 5A and 5B.

Figure 8:
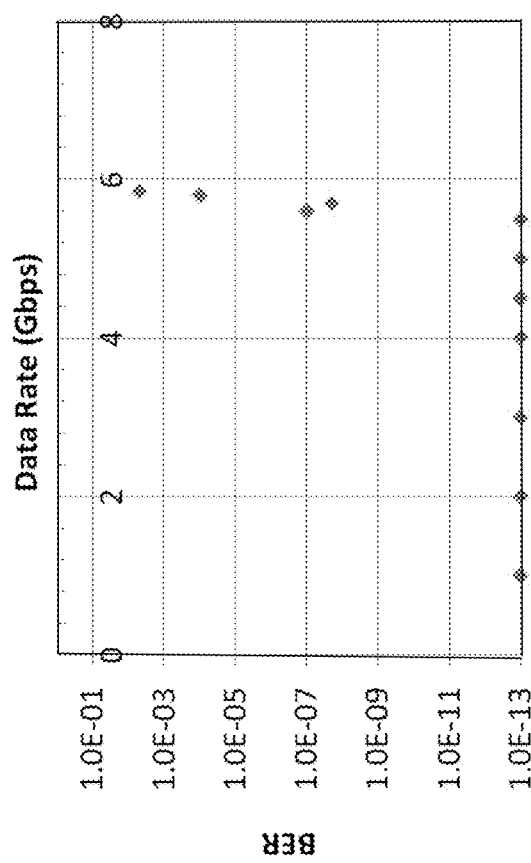
FIG. 8 is a graph of data rate (Gbps) vs. BER (Bit Error Rate) that shows a measured BER for the demonstration board of the high speed isolator application of FIGS. 5A and 5B.

FIG. 8 is a graph of data rate (Gbps) vs. BER (Bit Error Rate) that shows a measured BER for the demonstration board of the high speed isolator application of FIGS. 5A and 5B.

Figure 9:
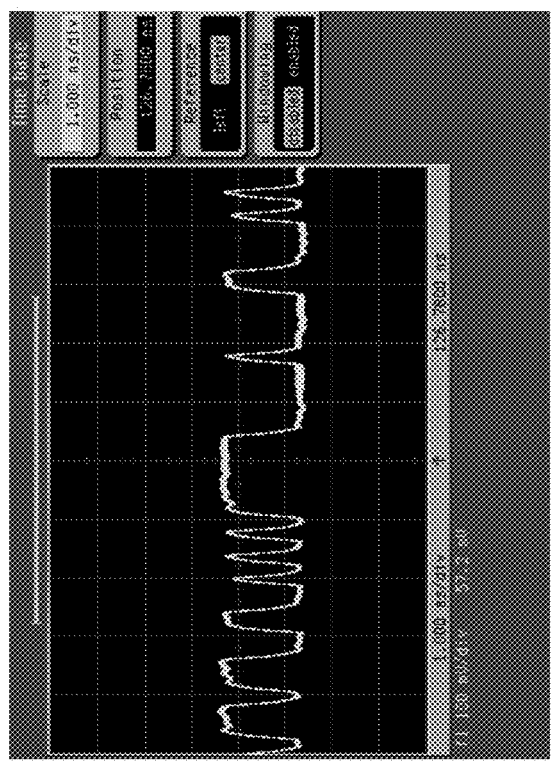
FIG. 9 shows a 5 Gbit/s $2^7-1$ PRBS (pseudo-random binary sequence) waveform on the RX chip used in the demonstration board of the high speed isolator application of FIGS. 5A and 5B.

FIG. 9 shows a 5 Gbit/s $2^7-1$ PRBS (pseudo-random binary sequence) waveform on the RX chip used in the demonstration board of the high speed isolator application of FIGS. 5A and 5B.

Figure 10:
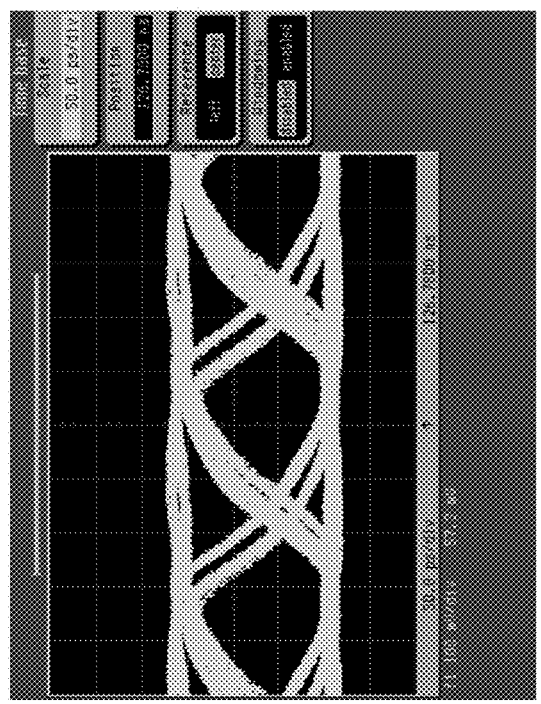
FIG. 10 shows a measured eye diagram of the 5 Gbit/s $2^7-1$ PRBS waveform at the RX chip of the demonstration board of the high speed isolator application of FIGS. 5A and 5B.

FIG. 10 shows a measured eye diagram of the 5 Gbit/s $2^7-1$ PRBS waveform at the RX chip of the demonstration board of the high speed isolator application of FIGS. 5A and 5B.

Figure 11:
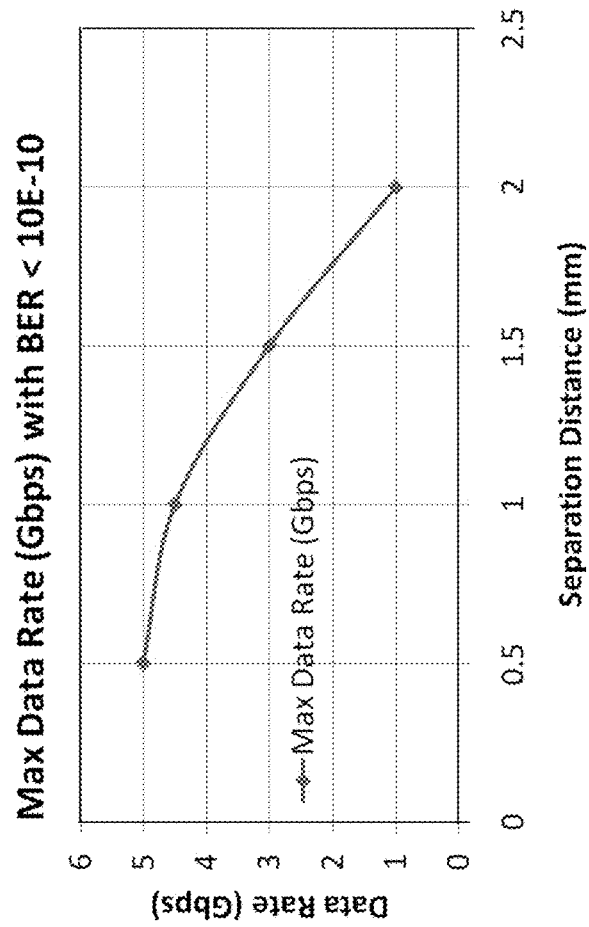
FIG. 11 is a graph of separation distance (mm) vs. data rate (Gbps) that shows a maximum wireless connector data rate with a BER<$10^{-10}$.

FIG. 11 is a graph of separation distance (mm) vs. data rate (Gbps) that shows a maximum wireless connector data rate with a $BER<10^{-10}$.

Advantages of the Invention

The present invention provides the following advantages:

Low channel loss:
  PNFDs improve the channel loss by about 20 dB which significantly relaxes the link budget of the M2W2-interconnect.

Excellent Isolation:
  PNFDs increase the isolation between adjacent channels to as high as 20 dB.

Ultra-wide band:
  The bandwidth of PNFDs is extremely wide (across 10 GHz).

Simple packaging:
  This concept effectively removes the lossy mm-wave packaging issue and reduces the complexity of the overall system.

High Data Rate:
  As high as tens of Gbps is possible in the future by simultaneously sending multiple channels.

Low Power:
  Compared with a classical opto-isolator, the M2W2 base isolator is able to only consume about one-third of the power.

Scalable:
  As CMOS technology continues scaling, more channels will be available.

A high speed M2W2 interconnect with PNFDs can be applied in ultra-high speed high voltage isolators, such as hybrid cars, smart power meters, replacement of opto-isolators, etc. This technology is also applicable to high speed contactless connectors.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A wireless interconnect for transmitting and receiving signals at specified frequencies for short-range communication with high data rate capability, comprising:
  one or more periodic near field directors (PNFDs) that are near field coupled to both a transmitter and a receiver in a short-range millimeter wave wireless (M2W2) interconnect for transmitting and receiving radio frequency (RF) signals at millimeter-wave frequencies to provide short-range communication with high data rate capability between the transmitter and receiver,
  wherein there is near field coupling between at least two consecutive periodic coupling structures (PCSs) in the periodic near field directors, so that the near field coupling is extended in a cascade fashion by the periodic coupling structures from the transmitter to the receiver.

2. The wireless interconnect of claim 1, wherein the periodic coupling structures are comprised of metallic strips positioned such that their lengthwise dimension is substantially perpendicular to a propagation direction of the radio frequency signals between the transmitter and receiver.

3. The wireless interconnect of claim 1, wherein each of the periodic coupling structures is positioned parallel to adjacent periodic coupling structures with a separation distance between each periodic coupling structure being within one wavelength of the radio frequency signal.

4. The wireless interconnect of claim 1, wherein the periodic near field directors include first and second periodic near field directors that are coupled to each other for transmitting and receiving the radio frequency signals between the first and second periodic near field directors.

5. The wireless interconnect of claim 4, wherein there is an air gap between the first and second periodic near field directors.

6. The wireless interconnect of claim 1, wherein:
  the transmitter modulates a carrier signal with an input data stream, wherein the modulated carrier signal is then fed to a transmitter antenna that radiates the modulated carrier signal;
  the receiver receives the radiated carrier signal at a receiver antenna and converts the received carrier signal to a full swing digital signal as an output data stream; and
  the transmitter and receiver use asynchronous modulation and differential signaling for communicating between integrated circuit chips or printed circuit boards.

7. The wireless interconnect of claim 6, wherein the transmitter or receiver antenna comprises an on-chip differential dipole antenna.

8. A method for transmitting and receiving signals at specified frequencies for short-range communication with high data rate capability using a wireless interconnect, comprising:
  near field coupling one or more periodic near field directors (PNFDs) to both a transmitter and a receiver in a short-range millimeter wave wireless (M2W2) interconnect for transmitting and receiving radio frequency (RF) signals at millimeter-wave frequencies to provide short-range communication with high data rate capability between the transmitter and receiver,
  wherein there is near field coupling between at least two consecutive periodic coupling structures (PCSs) in the periodic near field directors, so that the near field coupling is extended in a cascade fashion by the periodic coupling structures from the transmitter to the receiver.

9. The method of claim 8, wherein the periodic coupling structures are comprised of metallic strips positioned such that their lengthwise dimension is substantially perpendicular to a propagation direction of the radio frequency signals between the transmitter and receiver.

10. The method of claim 8, wherein each of the periodic coupling structures is positioned parallel to adjacent periodic coupling structures with a separation distance between each periodic coupling structure being within one wavelength of the radio frequency signal.

11. The method of claim 8, wherein the periodic near field directors include first and second periodic near field directors that are coupled to each other for transmitting and receiving the radio frequency signals between the first and second periodic near field directors.

12. The method of claim 11, wherein there is an air gap between the first and second periodic near field directors.

13. The method of claim 8, wherein:
  the transmitter modulates a carrier signal with an input data stream, wherein the modulated carrier signal is then fed to a transmitter antenna that radiates the modulated carrier signal;

the receiver receives the radiated carrier signal at a receiver antenna and converts the received carrier signal to a full swing digital signal as an output data stream; and the transmitter and receiver use asynchronous modulation and differential signaling for communicating between integrated circuit chips or printed circuit boards.

14. The method of claim 13, wherein the transmitter or receiver antenna comprises an on-chip differential dipole antenna.

15. The wireless interconnect of claim 1, wherein the periodic near field directors improve isolation between adjacent transceivers to increase a bandwidth density for the millimeter wave wireless (M2W2) interconnect.

16. The wireless interconnect of claim 1, wherein the periodic near field directors reduce channel loss between the transmitter and receiver by about 20 dB to relax a link budget for the millimeter wave wireless (M2W2) interconnect.

17. The wireless interconnect of claim 1, wherein the periodic near field directors have a bandwidth of about 10 GHz.

18. The method of claim 8, wherein the periodic near field directors improve isolation between adjacent transceivers to increase a bandwidth density for the millimeter wave wireless (M2W2) interconnect.

19. The method of claim 8, wherein the periodic near field directors reduce channel loss between the transmitter and receiver by about 20 dB to relax a link budget for the millimeter wave wireless (M2W2) interconnect.

20. The method of claim 8, wherein the periodic near field directors have a bandwidth of about 10 GHz.

* * * * *